Aug. 11, 1925.  
J. E. HALE  
1,549,718  
VEHICLE WHEEL RIM  
Filed Aug. 20, 1920  3 Sheets-Sheet 1

Witness:  
Philip E. Barnes

Inventor  
James E. Hale  
By R. D. Trogner  
his Attorney

Aug. 11, 1925.  
J. E. HALE  
VEHICLE WHEEL RIM  
Filed Aug. 20, 1920
1,549,718
3 Sheets-Sheet 2
Fig. 3.
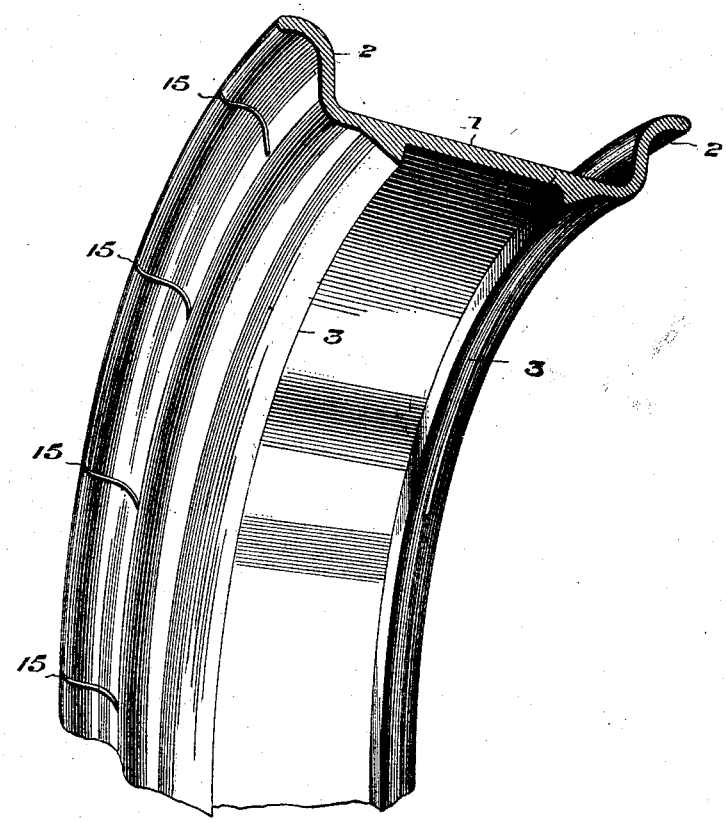
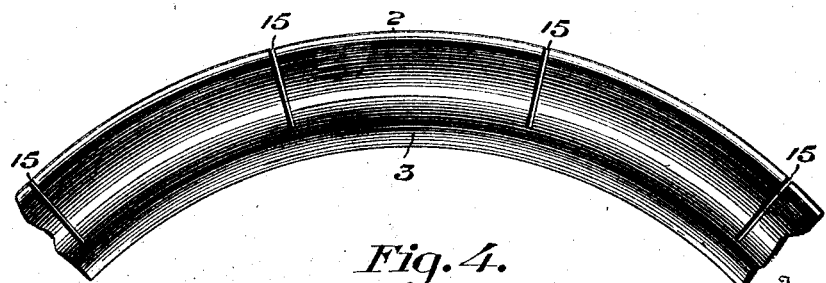
Fig. 4.
Inventor  
James E. Hale

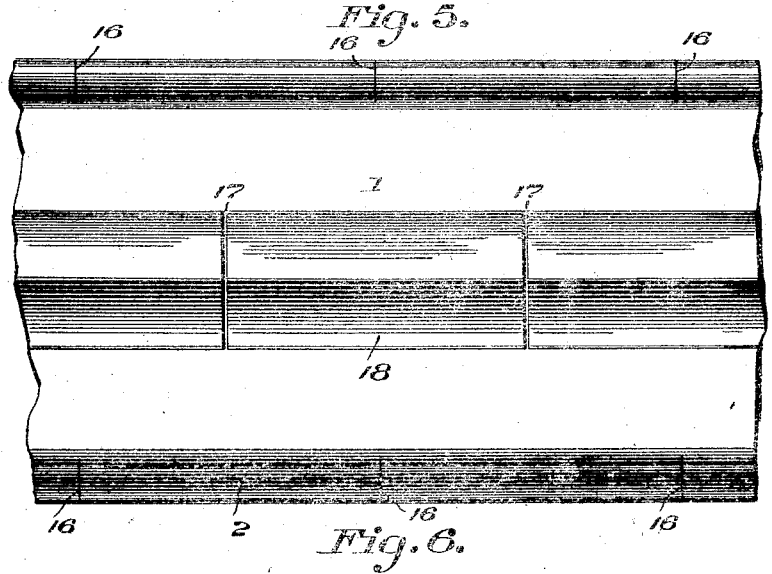
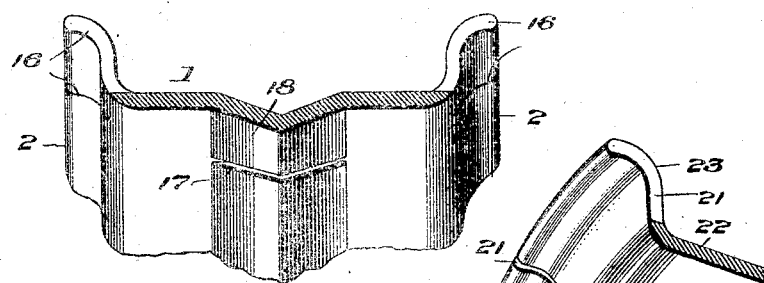
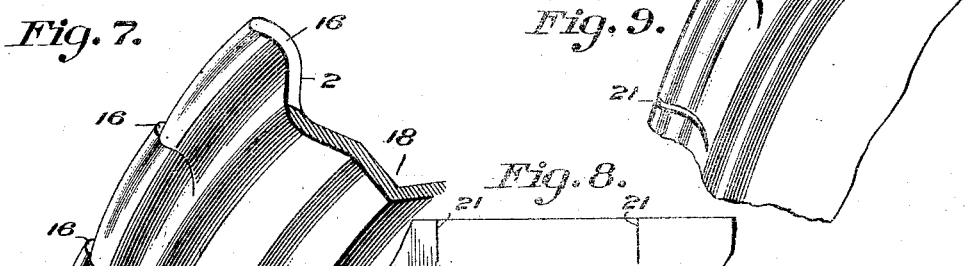
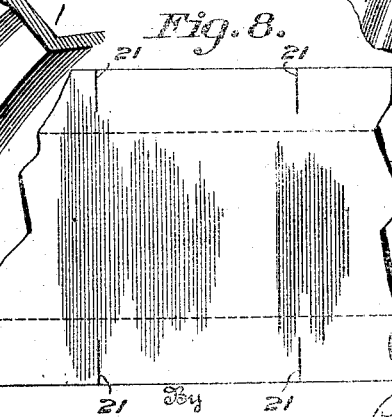

Patented Aug. 11, 1925.

1,549,718

UNITED STATES PATENT OFFICE.

JAMES E. HALE, OF AKRON, OHIO, ASSIGNOR TO THE GOODYEAR TIRE & RUBBER COMPANY, OF AKRON, OHIO, A CORPORATION OF OHIO.

VEHICLE WHEEL RIM.

Application filed August 20, 1920. Serial No. 404,808.

*To all whom it may concern:*

Be it known that I, JAMES E. HALE, a citizen of the United States, and resident of Akron, Ohio, have invented new and useful Improvements in Vehicle Wheel Rims, of which the following is a specification.

My invention relates to vehicle rims for resilient tires, and it has for its principal object to provide an improved radially flexible rim and a method of manufacture for producing such a rim.

The many principal and ancillary objects and advantages to be derived from practicing my invention will be apparent from a perusal of the accompanying description in conjunction with the drawings in which:

Fig. 3 is a transverse sectional view showing an intermediate step in the manufacture of the rim shown in Figs. 1 and 2;

Fig. 4 is a side elevational view of the rim shown in Fig. 3;

Figs. 5 and 6 are, respectively, a bottom plan view and a transverse sectional view of a pressed metal rim incorporating my invention;

Fig. 7 is a fragmentary sectional view in perspective of a pressed metal rim in the process of manufacture;

Fig. 8 is a plan view of a metal strip preparatory to its manufacture into a completed rim; and Fig. 9 is a fragmentary sectional view, in perspective, of a rim constructed from the metal strip shown in Fig. 8.

Figure 1:
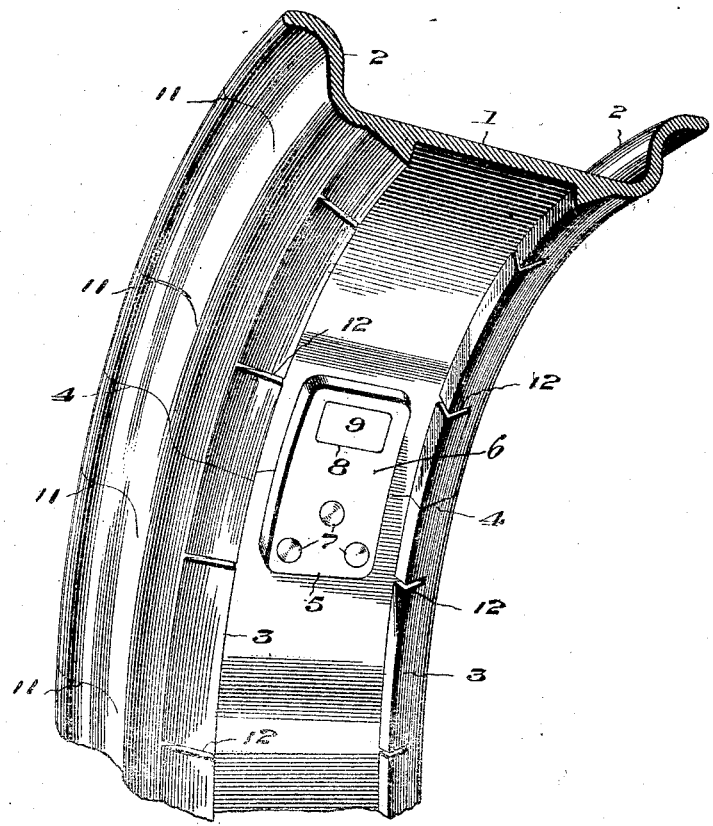
Fig. 1 is a transverse sectional view, shown in perspective, of a portion of a rim constructed in accordance with my invention.
Figure 2:
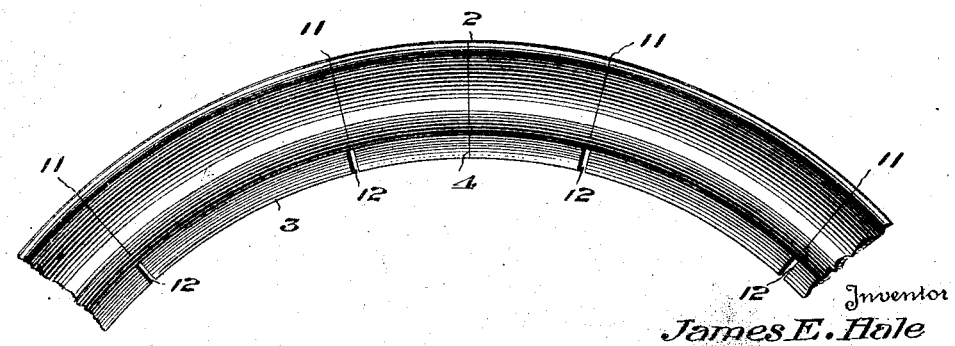
Fig. 2 is a side elevational view of a portion of the rim indicated in Fig. 1.

The rim shown in Figs. 1 and 2 of the drawings may be of any sectional design, but is here shown as a hot rolled metal section having a base portion 1, a pair of outwardly extending flanges 2, that serve to confine the bead portions of a vehicle tire adapted to be mounted on the rim, and a pair of inwardly extending supporting flanges 3 that serve to mount the rim on the felloe band of the vehicle wheel. Rims of this general class are provided, at some point in their periphery, with a transverse cut 4—4 at which point the rim may be separated and its diameter reduced by drawing the ends thereof over one another in the conventional manner.

In this particular instance I have illustrated a locking mechanism 5 that embodies a latch 6 that is secured to one end of the split rim by a series of rivets 7, and which has an aperture 8 that is adapted to receive a lug 9 that is secured to the other end of the rim. The ends of the rim are disengaged by drawing the latch 6 radially inward to release the lug 9 and thus permit free manipulation of the ends of the rim.

It should be understood, however, that the specific method of securing the ends of the rim together is not a material feature of my invention and is illustrated only to present an operative mechanism.

My invention consists in providing the radial flanges 2 with a series of cuts 11 that extend through the flange and terminate substantially at the base 1 of the rim. The inwardly extending ribs 3 also have a series of cuts 12 spaced about the inner periphery of the rim.

For the sake of appearance, to avoid unnecessary wear and cutting of the tire casing, and for other reasons, the cuts 11 are made in a manner later to be described to provide cuts with close fitting sides which give a tire-retaining flange that presents a smooth peripheral external and internal surface except for the lines of cleavage of the several cuts. In the remaining portions of this specification and in the appended claims, I have referred to a cut of this particular type as a "closed cut", whereas a cut, such as the cut 12 that is made in the inwardly extending ribs of the rim is referred to as an "open cut".

The base 1 of the rim is substantially a continuous metal band of cylindrical shape without the stiffening effects of a continuous tire-retaining or supporting flange now employed in such rims. Such a rim presents a radially flexible structure that bends uniformly around its periphery when the severed ends of the rim are drawn one over the other to reduce the diameter of the rim for the application or removal of a vehicle tire. It will also be noted in Figs. 1 and 2 of the drawings, that the cuts 11 in the outwardly extending flanges 2 of the rim are substantially in radial alignment with the open cuts 12 of the supporting flanges 3. This feature sharply localizes the bending of the rim and thus provides a rim that is materially more flexible than if the cuts were otherwise distributed.

Figs. 3 and 4 of the drawings illustrate a step in the manufacture of the rim shown in Fig. 1, and represent a rim that has been formed in any conventional manner, such as by the rolling of a hot metal section or by other manipulation of the metal.

These figures show a series of open cuts 15 formed with a metal saw or other suitable tool and spaced around the periphery of the rim.

The rim is now shrunk to a smaller size by means of any convenient shrinking machine which forms the rim to size by external application of radial pressure. Shrinking the rim in this manner sharply localizes the zones of shrinkage to the base 1 of the rim adjacent the open cuts 15. The open cuts 15, shown in Fig. 3, are thus closed to form the cuts 11 shown in Figs. 1 and 2 of the drawings and described in conjunction therewith. After this shrinking has been effected to close the cuts 15, the inwardly extending flanges 3 of the rim, shown in Figs. 1 and 2, are cut by means of a metal saw, or other suitable instrument, to provide the series of open cuts 12 therein. This operation completes the rim shown in Figs. 1 and 2 with the exception of the locking mechanism 5 that may be of any conventional design.

The re-shaping or shrinking process just described, closes the several cuts in the bead-retaining flanges but preserves the open cuts in the rim supporting flanges 3. This is desirable since, when the ends of the rim are drawn together to reduce its diameter during the mounting or removal of a tire, the edges of the cuts in the inner flange partially close whereas the cuts in the upstanding flanges partially separate.

Although this is one of the preferred embodiments of my rim and a process of its manufacture, it will be evident that there are numerous other forms of which I have deemed it advisable to illustrate a few representative types. The rim shown in Figs. 1 to 4 of the drawings is of hot rolled metal section, whereas the remaining rim structures are of expanded metal.

Figs. 5, 6 and 7 show an expanded metal rim that has a series of shear cuts 16 in the upstanding flanges thereof, and a series of open cuts 17 in the supporting flange 18 of the rim.

Fig. 7 illustrates a formed section of rim in which the upstanding flanges have been sheared at spaced distances in any suitable manner. The operation of the shearing tool opens the cuts somewhat in the manner shown and it is necessary to re-shape the rim after such shearing action by rolling the flanges down or otherwise closing the cuts to obtain a rim of the form shown in Fig. 6 of the drawing.

It will be noted that, in this instance, the series of open cuts made in the inwardly extending supporting flange 18 are spaced symmetrically around the inner surface of the rim and are cut to substantially the depth of the base 1 thereof. It will also be noted that the cuts 16 are positioned intermediate the cuts 17 to provide a rim having more uniform flexibility than the rim shown in Figs. 1 to 4 of the drawings.

Although I have chosen to describe this section of rim as being constructed by shearing portions of the rim in such manner as to sever the metal at the series of cuts 16, it is obvious that the same method of procedure may be followed in the manufacture of a rim of this type as was employed to form the closed cuts in the rim of the hot metal section described in conjunction with Figs. 1 to 4 of the drawings.

Figs. 8 and 9 illustrate a further modification of my invention in which a metal band 20, that is later to be formed into a rim, is provided with a series of inwardly extending cuts 21 placed in the edge portions thereof. Such cuts may be shear cuts, or may be open spaces provided by stamping metal from the rim. The band is now molded to the shape shown in Fig. 9 by a conventional metal expanding machine.

Since the edge portions of the rim are non-continuous, the expansion of the metal in a rim of this general type is localized at points in the base 22 thereof and immediately adjacent thereto. Since the series of cuts 21 sever the upstanding flanges 23 at spaced intervals, the several adjacent flanged portions separate at their outer edges and thus form a series of wedge-like cuts around the periphery of the rim, as shown in Fig. 9. This illustrates the conditions that obtain when the metal of the upstanding flanges is not expanded in the pressing operation. A rim of this general type possesses very great flexibility in comparison with rims of other manufacture, since there are no continuous flanges to reinforce and thereby stiffen the rim radially.

It is not essential in this method of manufacture that the sheared edge portions be rolled to shape before the pressing operation is performed, since the subsequent pressing operation brings each of the elements of the flanges into their respective proper positions.

Although I have stated, in the appended claims, that the cuts in the tire supporting flanges terminate substantially in the base of the rim, it is to be understood that such statement is at all times to be construed as meaning any cut that is made in the tire supporting flange that substantially weakens the flange radially of the rim to render the rim more easily flexed in a radial direction.

Other modifications of my invention, such as the employment of a series of upstanding lugs in lieu of the tire supporting flanges, will be apparent from a study of my invention, and it is my intention to cover all such modifications as fully as the prior art will permit. Obviously, therefore, only such limitations shall be imposed on the spirit and scope of my invention as are indicated in the appended claims.

What I claim is:

1. A transversely split vehicle rim for resilient tires embodying a cylindrical base portion, upstanding flanges integral therewith and cut at spaced intervals to substantially the depth of the base portion, and an inwardly extending flange having a series of cuts terminating substantially at the juncture of the flange and the base portion.

2. A transversely split vehicle rim for resilient tires embodying a cylindrical base portion, an upstanding flange integral therewith and cut at spaced intervals to substantially the depth of the base portion, and an inwardly extending flange having a series of cuts terminating substantially at the juncture of the flange and the base portion, the cuts in the upstanding flange being substantially closed and the cuts in the inwardly extending flange being somewhat open.

3. A transversely split vehicle rim for resilient tires embodying a cylindrical base portion, upstanding flanges integral therewith and cut at spaced intervals to substantially the depth of the base portion, and an inwardly extending flange having a series of cuts terminating substantially at the juncture of the flange with the base portion and substantially in radial alignment with the corresponding cuts in the upstanding flanges.

In witness whereof, I have hereunto signed my name.

JAMES E. HALE.